Feb. 5, 1952   J. R. MacDONALD   2,584,479
PHONOGRAPH RECORD CUTTING MACHINE
Filed Aug. 16, 1949
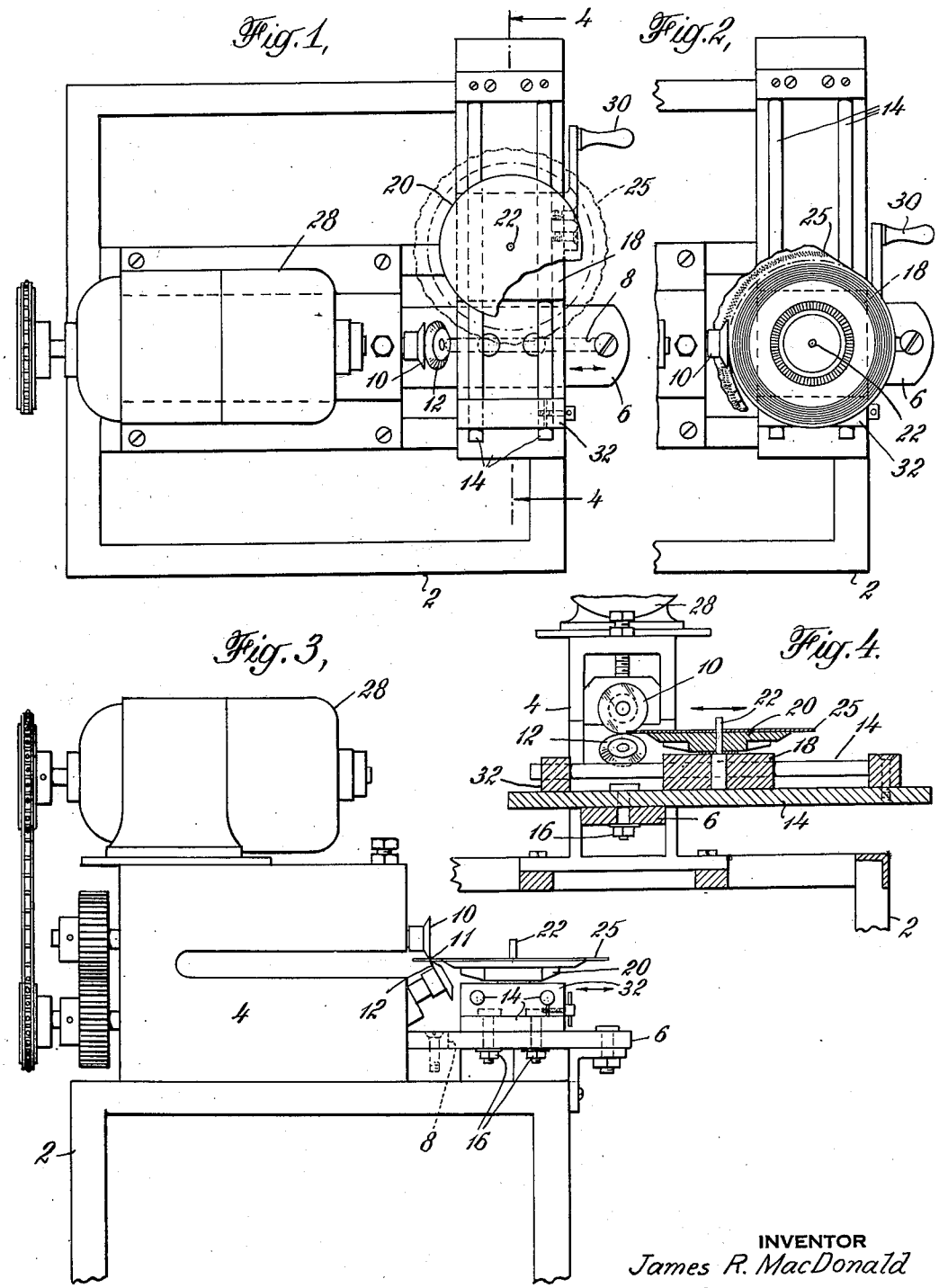
INVENTOR
James R. MacDonald
BY
Pennie, Edmonds, Morton and Barrows
ATTORNEYS Patented Feb. 5, 1952

2,584,479

UNITED STATES PATENT OFFICE 2,584,479

PHONOGRAPH RECORD CUTTING MACHINE

James R. MacDonald, Bridgeport, Conn., assignor to Columbia Records Inc., Bridgeport, Conn., a corporation of Delaware Application August 16, 1949, Serial No. 110,657

1 Claim. (Cl. 164—63)

This invention relates to the finishing of phonograph records and to a circular cutter therefor. For lack of an efficient and simple phonograph record cutter, phonograph records have been heretofore molded to the desired diameter by the use of matrices having sharp edges or coins formed therein for that purpose. The sharp coins formed in such matrices are a source of weakness and have limited the life of the matrices but have been used heretofore because the records molded therewith require only a buffing operation to remove a very thin fin formed at the parting line of two matrices.

In contrast to the circular shears used heretofore, the present cutter permits the records to be moved directly into cutting position on the cutter in a single sraightline motion, without requiring opening of the cutter jaws. The cutter of the present invention has the additional advantage that the records finished therewith have a perpendicular cylindrical edge which facilitates their use with certain recent types of phonograph record changers wherein an operating blade is brought to bear against the cylindrical edge of the record. Records finished according to the methods of the prior art have a rounded or double conical edge against which the blades of such record changers cannot be brought dependably to bear.

The cutter of the present invention employs a circular shear having two circular blades which are permanently in mesh with each other, and the records are brought into engagement with the blades by motion of a carriage which supports a turntable bearing the record to be trimmed. The carriage is moved along a path perpendicular to the axis of the shear, bringing the record within the reach of the blades. The blades cut into the untrimmed record along a tangent to the finished record circumference and continues along this circumference once the carriage is brought to a stop with the center of the record on the axis of the shear.

The ways which carry the turntable carriage are themselves adjustable in a direction perpendicular to their length and parallel to the axis of the shear so as to permit variation of the diameter to which the record will be trimmed. With the ways locked in proper position a record placed on the turntable is subjected to the trimming operation by a simple motion which drives the carriage down the ways until the center post of the turntable lies on the axis of the shear, where the carriage is stopped by a suitable abutment.

The invention will be further described with reference to the accompanying drawings in which Fig. 1 is a plan view of a cutter according to the present invention, showing the record-bearing turntable in loading position;

Fig. 2 is a fragmentary view similar to Fig. 1 but showing the turntable in cutting position;

Fig. 3 is a side elevation of the cutter of Figs. 1 and 2 with the turntable occupying the position shown in Fig. 2; and Fig. 4 is a sectional view in elevation taken on the line 4—4 of Fig. 1.

Referring to Figs. 1-4, a frame 2 supports a circular shear, generally indicated at 4, and a horizontal slide 6. The slide 6 has a lengthwise slot 8 parallel with the common plane of the axes of rotation of the shear blades 10 and 12. The horizontal line in this plane passing through the point of contact 11 between the blades will be referred to as the "axis" of the shear. A set of carriage ways 14 is mounted on the slide 6 and is adjustably fixable thereon along the length of the slot 8 by means of bolts 16. The ways support a turntable carriage 18 movable along the length of the ways 14 in a direction perpendicular to the length of the slit 8 and to the axis of the shear. The carriage 18 supports a turntable 20 having a center post 22 on which the phonograph record 25 to be trimmed is placed. The turntable 20 is mounted so as to rotate freely with respect to the carriage 18.

The cutter blades 10 and 12 are driven by suitable mechanism from a drive motor 28. The blades are suitably shaped so as to advance the record once they come in engagement therewith, as shown in Fig. 2.

The carriage 18 is moved along the ways 14 by means of a hand operated control 30, and is so proportioned together with an abutment 32 on the ways 14 that when the carriage is at the end of its travel the center post 22 of the turntable lies on the axis of the shear.

By adjustment of the carriage ways 14 back and forth along the slot 8 in the slide 6, the diameter to which the records will be cut is readily adjusted. Once this adjustment is made, the operation of the machine requires only that the untrimmed records be placed one at a time on the turntable with the carriage in retracted position (Fig. 1) and that the carriage be driven home to the position shown in Fig. 2. After the trimming of the record has been completed, the record may be lifted off the turntable with or without retracting the carriage.

I claim:

A phonograph record cutter comprising a circular shear having a pair of circular blades with beveled edges continuously engaging each other, said blades being so arranged with respect to each other that their axes of rotation intersect and define a vertical plane, means for rotating said blades, a first set of ways extending outwardly from said blades parallel to a horizontal line in said plane, a platform mounted on said first set of ways movable therealong toward and away from said blades only in a line parallel to said horizontal line, said platform having a set of carriage ways mounted thereon extending perpendicular to said horizontal line, a manually-movable carriage mounted on said carriage ways and movable therealong toward and away from said blades only in a line perpendicular to said horizontal line, a turntable carried by and freely rotatable with respect to said carriage, said turntable having its upper surface lying in a horizontal plane passing through the point of contact of said blades, and a stop carried by said platform on the opposite side of said blades from the turntable when the turntable is out of cutting position and in the path of longitudinal travel of said carriage, the stop being so positioned with respect to said vertical plane that when the carriage contacts the stop the axis of rotation of the turntable lies in said vertical plane, the means for rotating the blades rotating them in a direction such that a phonograph record placed on said turntable is continuously rotated in a direction to maintain the carriage against the stop during the cutting operation.

JAMES R. MacDONALD.

REFERENCES CITED

The following references are of record in the file of this patent:

UNITED STATES PATENTS

| Number | Name | Date |
|---|---|---|
| 670,636 | Hobbs | Mar. 26, 1901 |
| 2,190,758 | Albertson | Feb. 20, 1940 |
| 2,333,958 | Smith | Nov. 9, 1943 |